(12) United States Patent
Dingler et al.

(10) Patent No.: US 10,115,101 B2
(45) Date of Patent: *Oct. 30, 2018

(54) WIRELESS ESTABLISHMENT OF IDENTITY VIA BI-DIRECTIONAL RFID

(71) Applicant: INTERNATIONAL BUSINESS MACHINES CORPORATION, Armonk, NY (US)

(72) Inventors: John R. Dingler, Dallas, GA (US); Frank C. Fisk, Lawrenceville, GA (US); Sri Ramanathan, San Ramon, CA (US); Matthew A. Terry, Celebration, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,568

(22) Filed: Dec. 20, 2017

(65) Prior Publication Data

US 2018/0114214 A1 Apr. 26, 2018

Related U.S. Application Data

(63) Continuation of application No. 12/953,801, filed on Nov. 24, 2010, now Pat. No. 9,916,573.

(51) Int. Cl.
*G06Q 20/32* (2012.01)
*H04W 12/06* (2009.01)
(Continued)

(52) U.S. Cl.
CPC ......... *G06Q 20/3278* (2013.01); *G06F 21/35* (2013.01); *G06Q 20/20* (2013.01); *G06Q 20/3829* (2013.01); *H04L 9/321* (2013.01); *H04L 9/3215* (2013.01); *H04L 63/0492* (2013.01); *H04L 63/0846* (2013.01);
(Continued)

(58) Field of Classification Search
CPC ................................................ G06Q 20/3278
See application file for complete search history.

(56) References Cited

U.S. PATENT DOCUMENTS

| | | |
|---|---|---|
| 5,590,038 A | 12/1996 | Pitroda |
| 7,287,693 B2 | 10/2007 | Brookner |

(Continued)

*Primary Examiner* — Jacob C. Coppola
(74) *Attorney, Agent, or Firm* — Christopher K. McLane; Andrew M. Calderon; Robrets Mlotkowski Safran Cole & Calderon, P.C.

(57) ABSTRACT

A method, a system, and a computer program product are provided for wireless establishment of identity via bi-directional radio-frequency identification (RFID). The method is implemented in a computer infrastructure having computer executable code tangibly embodied on a computer readable storage medium having programming instructions operable for sending device data including at least a username and a password to a transceiver. The method also includes receiving an identifier of an access point in a wireless network from the transceiver, the transceiver sending the device data to the access point via a security server. The device data is sent to the access point based on the identifier of the access point, the access point establishing a secure connection to the computer infrastructure based on the device data received from the transceiver and the computer infrastructure.

17 Claims, 5 Drawing Sheets

(51) Int. Cl.
*H04L 29/06* (2006.01)
*H04L 9/32* (2006.01)
*G06Q 20/38* (2012.01)
*G06Q 20/20* (2012.01)
*G06F 21/35* (2013.01)
*H04W 88/08* (2009.01)
*H04W 48/16* (2009.01)
*H04W 48/08* (2009.01)
*H04W 8/26* (2009.01)
*H04W 76/10* (2018.01)

(52) U.S. Cl.
CPC .......... *H04L 63/0892* (2013.01); *H04W 12/06* (2013.01); *H04L 63/0442* (2013.01); *H04L 63/166* (2013.01); *H04L 2209/805* (2013.01); *H04L 2463/102* (2013.01); *H04W 8/26* (2013.01); *H04W 48/08* (2013.01); *H04W 48/16* (2013.01); *H04W 76/10* (2018.02); *H04W 88/08* (2013.01)

(56) References Cited

U.S. PATENT DOCUMENTS

| | | | |
|---|---|---|---|
| 7,340,439 B2 | 3/2008 | Burger et al. | |
| 7,515,901 B1 | 4/2009 | Kaundinya | |
| 7,570,939 B2 | 8/2009 | Culbert | |
| 7,574,606 B1 | 8/2009 | Fan et al. | |
| 7,661,128 B2 | 2/2010 | Chen et al. | |
| 9,471,916 B2 * | 10/2016 | Dingier | G06F 21/35 |
| 2005/0210243 A1 | 9/2005 | Archard et al. | |
| 2005/0257045 A1 | 11/2005 | Bushman et al. | |
| 2006/0123463 A1 | 6/2006 | Yeap et al. | |
| 2006/0225130 A1 | 10/2006 | Chen et al. | |
| 2007/0023508 A1 | 2/2007 | Brookner | |
| 2007/0186105 A1 | 8/2007 | Bailey et al. | |
| 2008/0040602 A1 | 2/2008 | Williams et al. | |
| 2008/0126478 A1 * | 5/2008 | Ferguson | G06F 19/321 709/203 |
| 2008/0132207 A1 | 6/2008 | Gallagher et al. | |
| 2008/0141360 A1 | 6/2008 | Hicks et al. | |
| 2008/0192932 A1 | 8/2008 | Graeber et al. | |
| 2008/0320297 A1 | 12/2008 | Sabo et al. | |
| 2009/0143104 A1 | 6/2009 | Loh et al. | |
| 2009/0200371 A1 | 8/2009 | Kean et al. | |
| 2009/0320108 A1 * | 12/2009 | Livingston | G06F 21/31 726/6 |
| 2010/0136923 A1 | 6/2010 | Rofougaran | |
| 2010/0320266 A1 | 12/2010 | White | |
| 2011/0088100 A1 * | 4/2011 | Rutman | G06F 21/10 726/28 |

\* cited by examiner

WIRELESS ESTABLISHMENT OF IDENTITY VIA BI-DIRECTIONAL RFID

TECHNICAL FIELD

The present invention generally relates to a method, a system, and a computer program product for wireless establishment of identity, and more particularly, to a method, a system, and a computer program product for wireless establishment of identity via bi-directional radio-frequency identification (RFID).

BACKGROUND

The credit card or the debit card is the payment system of choice of consumers for their secure transactions. Using its magnetic stripe, the credit card or the debit card may store and transfer data, such as a consumer's name, card number, and card expiration date, to a payment terminal. This card information is utilized by the payment terminal to electronically verify that the card is valid and that the consumer has sufficient money to purchase an item. Once the card and the consumer is verified, the payment terminal may complete the purchase by electronically sending the purchase information to the consumer's and a vendor's bank.

However, credit card or debit card security relies on the physical security of the card itself and the privacy of the card number and expiration date. For example, if a consumer loses his or her card, the card may be used by someone else and, thus, the security of the card may be compromised. In another example, a card number may be easily stolen at the time of purchase by a unscrupulous vendor, and at the time of electronic verification and/or data transfer. The latter instance has been especially rampant with the rise of Internet commerce coupled with the rise of Internet data hackers.

In addition, credit or debit cards can be inconvenient in certain scenarios. For instance, many vendors take only a few certain brands of credit or debit cards, and unless a consumer has a credit or debit card required by a vendor, he or she may be able to make a purchase with a credit or debit card. Credit or debit card convenience also relies on a consumer physically having the card at the time of purchase, instead of being left at his or her home or office. In yet another example, a magnetic stripe of a card may wear down over repeated use over time. Thus, there is a need for a method and a system that allows for more secure and convenient transactions than those using credit or debit cards.

SUMMARY

In a first aspect of the invention, a method is implemented in a computer infrastructure having computer executable code tangibly embodied on a computer readable storage medium having programming instructions operable for sending device data including at least a username and a password to a transceiver. The method also includes receiving an identifier of an access point in a wireless network from the transceiver, the transceiver sending the device data to the access point via a security server. The device data is sent to the access point based on the identifier of the access point, the access point establishing a secure connection to the computer infrastructure based on the device data received from the transceiver and the computer infrastructure.

In another aspect of the invention, a system is implemented in hardware, including a computing device operable to send device data including at least a username and a password to a transceiver. The computing device is also operable to receive an Internet Protocol (IP) address of a security server accessed via a cellular network from the transceiver, the transceiver being operable to send the device data to the security server. The device data is sent to the security server based on the IP address of the security server, the security server being operable to establish a secure connection to the computing device based on the device data received from the transceiver and the computing device.

In an additional aspect of the invention, a computer program product includes a computer usable storage medium having readable program code embodied in the storage medium, the computer program product includes at least one component operable to send device data including at least a username and a password to a transceiver. The at least one component is also operable to receive from the transceiver an Internet Protocol (IP) address of a security server accessed via a cellular network, the transceiver sending the device data to the security server. The device data is sent to the security server based on the IP address of the security server, the security server establishing a secure connection to the at least one component based on the device data received from the transceiver and the at least one component.

In another aspect of the invention, a method of deploying a system for establishing a secure connection between a computer infrastructure and a wireless network, includes providing the computer infrastructure, being operable to send device data including at least a username and a password to a transceiver. The computer infrastructure is also operable to receive an identifier of an access point in the wireless network from the transceiver, the transceiver sending the device data to the access point via a security server. The device data is sent to the access point based on the identifier of the access point, the access point establishing the secure connection to the computer infrastructure based on the device data received from the transceiver and the computer infrastructure.

In an additional aspect of the invention, a computer system for establishing a secure connection between the computer system and a wireless network, includes a CPU, a computer readable memory and a computer readable storage media. The computer system also includes first program instructions to send device data including at least a username and a password to a transceiver. The computer system further includes second program instructions to receive an identifier of an access point in the wireless network from the transceiver, the transceiver sending the device data to the access point via a security server. Third program instructions send the device data to the access point based on the identifier of the access point, the access point establishing the secure connection to the computer system based on the device data received from the transceiver and the computer system. The first, second and third program instructions are stored on the computer readable storage media for execution by the CPU via the computer readable memory. The computer system additionally includes a bi-directional radio-frequency identification (RFID) chip including a shared memory, and the sending of the device data to the transceiver is performed when the computer system is within a range of the transceiver. The access point establishes the secure connection when the device data from the transceiver matches the device data from the computer system.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 1 shows an illustrative environment for implementing steps in a wireless network in accordance with aspects of the invention.

DETAILED DESCRIPTION

Figure 1:
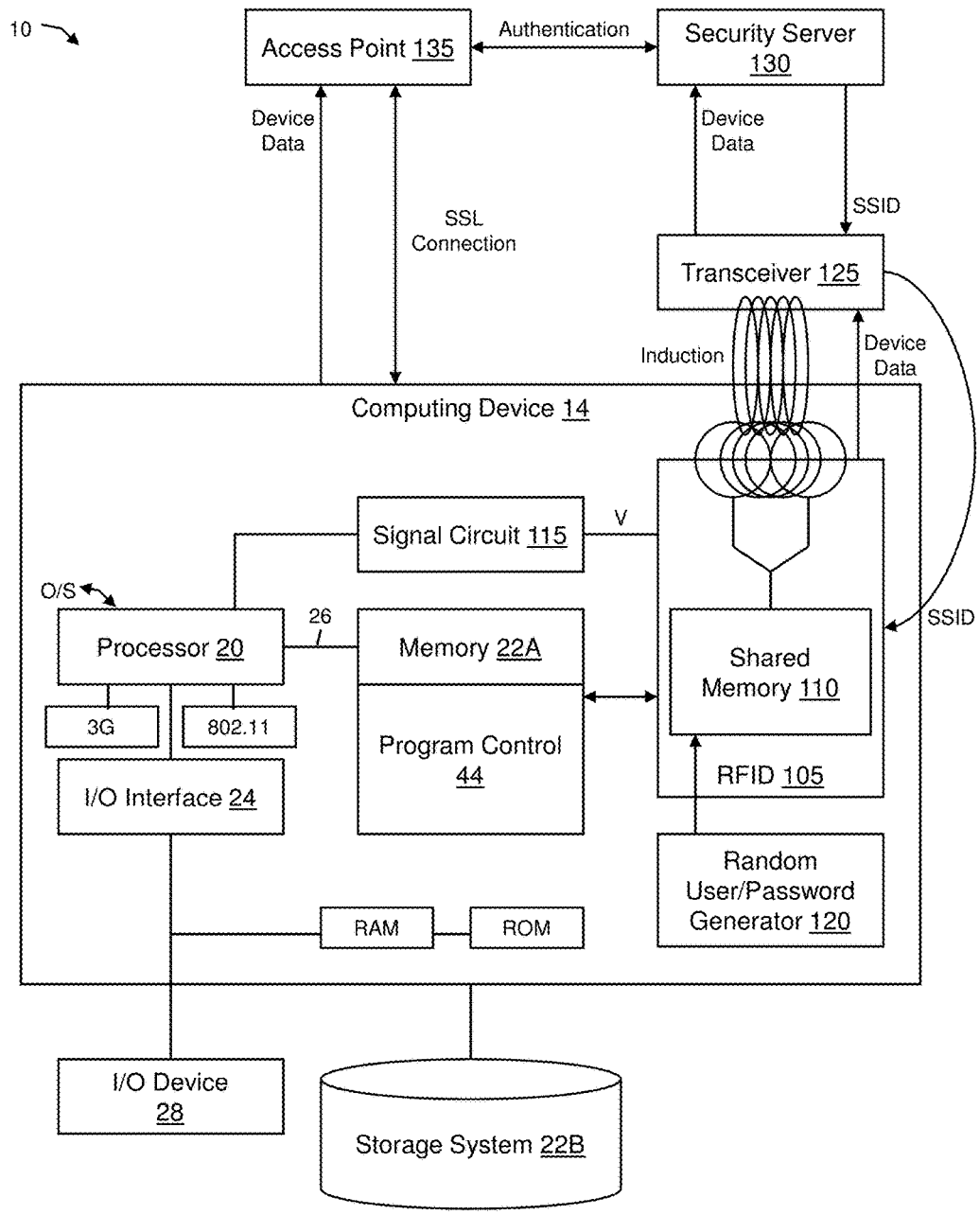

The present invention generally relates to method, a system, and a computer program product for wireless establishment of identity, and more particularly, to a method, a system, and a computer program product for wireless establishment of identity via bi-directional radio-frequency identification (RFID). More specifically, the invention is directed to using a bi-directional RFID chip or tag to establish connectivity between two entities (i.e., a wireless device and a wireless network), negotiate a connection mechanism, and transmit secure information, such as personal data, conveniently, safely, and securely. The bi-directional RFID utilizes radio waves to perform these processes. In implementation, the invention provides a secure method for temporary authentication by including the bi-directional RFID with a pseudo random username and password generator. In embodiments, the invention may also provide a method for secure transmission by including the bi-directional RFID with public key encryption.

In operation, the present invention includes first establishing a user name and password pairing that can be manipulated by a wireless device and placed in a shared memory of a bi-directional RFID in the wireless device. The user name and password pairing is then transferred via the short-range, bi-directional RFID to, for example, a Remote Authentication Dial In User Service (RADIUS) server that allows the wireless device temporary logon to a wireless network, using secure wireless channels and/or Secure Sockets Layer (SSL) for encrypted communication. Advantageously, the wireless device can connect to the wireless network conveniently and safely via the short-range proximity verification of RFID, and can transmit data to the wireless network securely over, for instance, wireless SSL.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a computing device 14 that can perform the processes described herein. The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a short-range, bi-directional RFID 105 chip or tag including a shared memory 110. While executing the computer program code, the processor 20 can read and/or write data to/from memory 22A, storage system 22B, and/or I/O interface 24. The program code executes the processes of the invention, for example, using the RFID 105 to establish identity of the computing device 14, establish connectivity between the computing device 14 and another entity, negotiate a connection mechanism, and transmit secure information. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

The computing device 14 is further in communication with an 802.11 wireless LAN ("802.11") chip and a $3^{rd}$ Generation ("3G") chip, and/or a signal circuit 115. The 802.11 chip and the 3G chip allow the computing device 14 to communicate with other devices in an 802.11 network and a 3G cellular network, respectively. For example, data on the computing device 14 may be transferred from the memory 22A, processed via the processor 20 and any one of the chips into a signal of the corresponding standard (e.g., the 802.11 standard), and transferred to the other devices via an antenna (not shown) of the computing device 14.

The signal circuit 115 allows the computing device 14 to communicate with the other devices via the short-range, bi-directional RFID 105 including the shared memory 110. For instance, the signal circuit 115 checks for changes in voltage of an induction antenna of the RFID 105. When there is such a change, the signal circuit 115 is triggered to send an interrupt signal to the processor 20 to inform the processor 20 that the RFID 105 has received a voltage load from the induction antenna.

The RFID 105 is an integrated circuit that processes and stores data in the shared memory 110, and that receives and transmits RF signals via induction of the induction antenna. The RFID 105 is in communication with the program control 44 and/or the memory 22A to transfer data between these components. The RFID 105 is capable of reading and transferring data from the shared memory 110.

The computing device 14 further includes a random user/password generator 120. The random user/password generator 120 generates a temporary user name and a temporary password that is transferred to the shared memory 110 of the RFID 105. The shared memory 110 stores the user name and the password.

The environment 10 further includes a transceiver 125, a security server 130, and an access point 135. The transceiver 125 is a passive, bi-directional RFID chip or reader of another computing device or object. The transceiver 125 can receive and transmit RF signals to and from the RFID 105 of the computing device 14. As will be discussed herein, the transceiver 125 is a point or location where a user initiates a process of securing a connection to a wireless or cellular network to exchange secure information with at least one entity in the wireless or cellular network. In addition, the transceiver 125 is in communication with the security server 130, and signals may be transferred between the transceiver 125 and the security server 130.

The security server 130 is a server such as a RADIUS server that stores valid credentials (e.g., a username and a password) that are allowed to connect to a wireless or cellular network. The security server 130 is in communication with the transceiver 125 and the access point 135, and signals may be transferred between the security server 130 and the transceiver 125, and the security server 130 and the access point 135. In operation, for example, the security server 130 may receive a username and a password of a computing device (e.g., the computing device 14) from the transceiver 125, and grant the computing device access to a wireless or cellular network. The security server 130 may then transfer the username and the password to the access point 135 and/or inform the access point 135 that the computing device 14 has been authenticated to have access to the wireless or cellular network.

The access point 135 is a computing device or a server that provides access to a secure wireless network requiring authentication of user devices requesting access to the network. Once a user device is authenticated for access to the wireless network, the access point 135 routes data between the authenticated user device and devices on the wireless network. As discussed above, the access point 135 may also be in communication with the security server 130 to receive the username and the password of the user device and/or confirmation that the security server 130 has authenticated the user device to have access to the wireless network.

Using the environment 10 as described above, the computing device 14 may conveniently and safely establish its identity, establish connectivity with another computing device or server in a wireless network, and transmit secure information including personal data. For example, in operation, a user of the computing device 14 (e.g., a mobile device) may enter a location, such as a gas station or an amusement park, that will require various cash transactions. The user and the location may desire that these cash transactions be quick and easy, yet secure. With the computing device 14 in the environment 10 within the location, the user may walk up to a terminal including the transceiver 125. When the computing device 14 is within a range of the transceiver 125, the computing device 14 automatically initiates communication with the terminal via the RFID 105 and the transceiver 125, to begin a process of securely connecting to a wireless network of the location.

Next, the passive, bi-directional RFID of the transceiver 125 receives device data from the RFID 105 of the computing device via induction of the antenna of the RFID 105 over close proximity. In embodiments, the device data may include the temporary username and the temporary password generated by the random user/password generator 120 of the computing device 14 and stored in the shared memory 110 of the RFID 105. Alternatively, the device data may include a username and a password defined by the user via the I/O device 28. The device data may further include a geographical location of the computing device 14 determined by a Global Positioning System (GPS) chip (not shown) in the computing device 14. The location may be in, for example, units of latitude and longitude. In additional embodiments, the device data may include an 802.11 Media Access Control (MAC) address of the computing device 14 and/or an ID number of a terminal including the transceiver 125.

In embodiments, the transceiver 125 may also acknowledge receipt of the device data from the computing device 14. The transceiver 125 may return to the computing device 14 a Service Set identifier (SSID) that identifies the wireless network of the location, specifically, the access point 135. The transceiver 125 then sends device data from the computing device 14 to the security server 130, which grants the computing device 14 access to the wireless network for a fixed duration of time and stores the device data. In further embodiments, the security server 130 may be the component that returns the SSID of the access point 135 to the computing device 14 via the transceiver 125. The security sever 130 may forward the device data to the access point 135 and/or inform the access point 135 that the computing device 14 has been authenticated to have access to the wireless network. In response, the access point 135 may also grant the computing device 14 access to the wireless network.

In embodiments, to add an extra layer of security for the connection between the computing device 14 and the wireless network, the computing device 14 may prompt the user to acknowledge the initiation of the secure connection with the location for the fixed duration of time. This prompt may include, for example, an "OK" button along with a note regarding the initiation of the secure connection, and may be presented to the user via an application program interface. If the user acknowledges the initiation, then the computing device 14 may connect to the access point 135 using the provided SSID and transmit the device data to the access point 135. The prompt allows the user to verify that he or she desires to connect to the wireless network before transmitting secure information. Alternatively, the computing device 14 may automatically connect to the access point 135 without user acknowledgment, thereby making the connection and/or the transaction between the user and the wireless network completely automatic for convenience.

The access point 135 completes a secure connection or communications channel to the computing device 14 based on the received device data and/or information from the computing device 14 and/or the security server 130. For instance, the access point 135 may authenticate that a temporary username and password received from the computing device 14 matches the temporary username and password received from the security server 130 before establishing the secure connection. In embodiments, the access point 135 may assure that a device location and/or a 802.11 MAC address received from the computing device 14 matches the corresponding data received from the security server 130. In additional embodiments, the secure connection may be over SSL-encrypted communications channels to ensure a higher level of security.

As a result of this establishing of the secure connection via the security server 130 and the access point 135, the user is able to use the computing device 14 to securely perform cash transactions, such as purchasing an item. That is, the user has the ability to communicate (e.g., provide purchase information, receive purchase receipts) with the wireless network over the secure connection. In addition, the authenticating of the computing device 14 at the security server 130 and the access point 135 enhances the security of the present invention by ensuring that the computing device 14 is not switched with another mobile device and that the device data is not captured by another mobile device during the connection process. Furthermore, the present invention provides the added convenience of using the bi-directional RFID 105 and the transceiver 125 to initiate cash transactions. Once a secure connection with a wireless network is established, a user can make a purchase anywhere at a location (e.g., at various terminals including RFID transceivers within the location) without having to establish the secure connection. In embodiments, for example, the user may use the computing device 14 to purchase drinks from a vending machine, and/or to pay for lunch with an "express" line terminal.

In embodiments, once a secure connection with a wireless network is established, a user may walk up to a point of sale (POS) and enter a unique code from the POS into a user device to communicate to the POS over the existing secure connection. The POS is a location where a sale transaction occurs and may include a terminal or computing device including hardware and software. The POS is connected to a wireless network and may be accessed via an access point (e.g., 135 in FIG. 1). The POS receives the user's purchase information (e.g., credit card information) and indicates to the user that payment has been received. For example, at an auction, a user can use an existing secure connection to enter a bid from a mobile device, and the POS could validate the bid against the user's credit limit and receive the user's purchase information.

In embodiments, the computing device 14 and/or the security server 130 may set an expiration time for the temporary username and the temporary password generated by the random user/password generator 120. This forces the user to re-authenticate his or her mobile device by re-initiating the connection process with the transceiver 125 of the terminal. Advantageously, having to regenerate the username and password after they expire ensures that the username and password are not kept as a standard username and password that may be stolen, which further enhances the security of the present invention.

In embodiments, the computing device 14 can block the random generation of the username and the password for a predetermined duration of time. For example, the computing device 14 may place an expiration flag on the current username and password that prevents them from being changed for one minute. This function is important for when the computing device 14 is communicating to the transceiver 125 and allows the computing device 14 to establish the secure connection with the access point 135 without having the username and password changed in the middle of the process.

Figure 2:
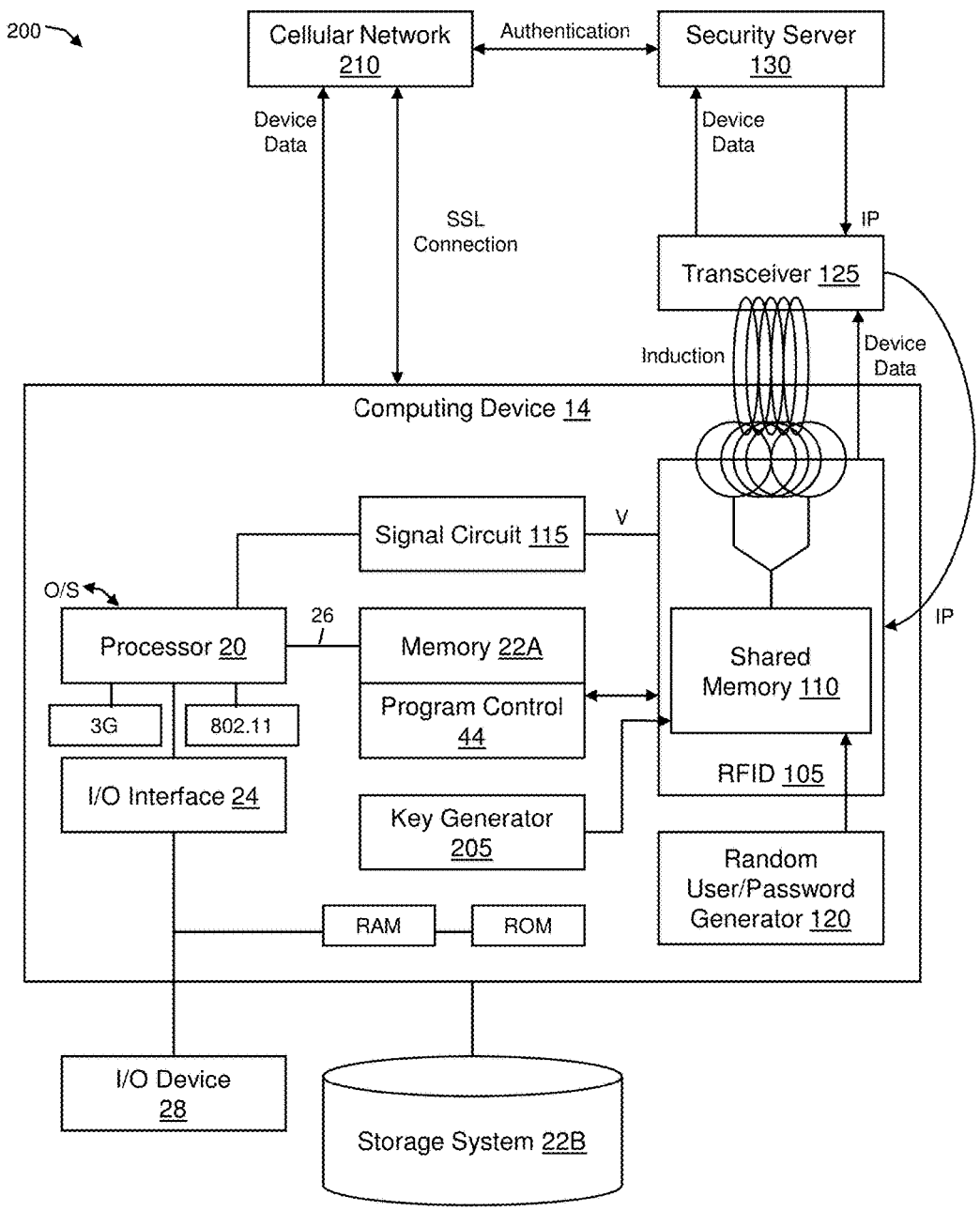
FIG. 2 shows another illustrative environment for implementing steps in a cellular network in accordance with aspects of the invention.

FIG. 2 shows another illustrative environment 200 for managing the processes in a cellular network in accordance with the invention. The computing device 14 includes the elements of FIG. 1, in addition to a key generator 205. The key generator 205 generates a public key for encrypting data and a private key for decrypting data. The public key and the private key may be generated and may decrypt and encrypt using, for example, the Rivest, Shamir, and Adleman (RSA) process or other cryptography processes known to those of skill in the art. The public key and the private key are transferred to the shared memory 110 of the RFID 105, and the shared memory 110 stores the public key and the private key. These keys may be stored on a keyring for the specific cellular network 210, along with the temporary username and password generated by the random user/password generator 120 that may also be stored on the keyring. This allows a user to store a username and password for use with a specific transceiver and allows the user's device to share a public key with the specific transceiver during the connection process. The shared public key can be used to encrypt data transferred between at least the specific transceiver and the user's device during later connections between the two components, for added security.

The environment 200 includes an external cellular network 210 that provides a secure connection or communications channel from the computing device to a location or another computing device within the cellular network 210. For instance, the another computing device may be a mobile device or a terminal in the cellular network 210, and the another computing device may be capable of communicating over the SSL protocol and, thus, secure, SSL-encrypted connections. The cellular network 210 may also be in communication with the security server 130 to receive the device data and/or confirmation that the security server 130 has authenticated the user device to have access to the cellular network.

Using the environment 200 as described above, the computing device 14 may conveniently and safely establish its identity, establish connectivity with another computing device or server in the cellular network 210, and transmit secure information including personal data. For example, in operation, a user of the computing device 14 (e.g., a mobile device) may enter a location including the environment 200. When the computing device 14 is within a range of the transceiver 125, the computing device 14 automatically initiates communication with the transceiver 125 via the RFID 105, to begin a process of securely connecting to a cellular network of the location.

Next, the passive, bi-directional RFID of the transceiver 125 receives the device data from the RFID 105 of the computing device via induction of the antenna of the RFID 105 over close proximity. In embodiments, the device data may include the temporary username and the temporary password and the location of the computing device 14. In the environment 200, the device data may further include the public key generated by the key generator 205 and stored in the shared memory 110 of the RFID 105. The shared public key may be used to encrypt data transferred between the components that receive the public key during later connections between the components, for added security.

In embodiments, the transceiver 125 may also acknowledge receipt of the device data from the computing device 14. The transceiver 125 may return to the computing device 14 an external Internet Protocol (IP) address of the security server 130. The computing device 14 may use this external IP address to connect to the security server 130 via the external cellular network 210. The transceiver 125 then sends device data from the computing device 14 to the security server 130, which stores the device data. The security server 130 may use the device data to grant the computing device 14 access to the cellular network 210 for a fixed duration of time.

In embodiments, the transceiver 125 may validate whether the computing device 14 is at a same location as the location received in the device data, to ensure that the computing device 14 has not moved out of the range of the transceiver 125. To perform the validation, the transceiver 125 may determine a location of the computing device 14 using a GPS chip in the transceiver 125. If the location of the computing device 14 cannot be validated, then the transceiver 125 may return a location validation failure message to the computing device 14, which then terminates the connection to the transceiver 125. If the location of computing device 14 is validated, then the connection process continues.

In embodiments, the security server 130 may be the component that returns its external IP address to the computing device 14 via the transceiver 125. The security sever 130 may forward the device data to the another device within the cellular network 210 and/or inform the another device within the cellular network 210 that the computing device 14 has been authenticated to have access to the cellular network. In further embodiments, the security server 130 may validate the location of the computing device 14 received in the device data, in addition to or in alternative of the transceiver 125.

In embodiments, to add an extra layer of security for the connection between the computing device 14 and the cellular network, the computing device 14 may prompt the user to acknowledge the initiation of the secure connection with the cellular network for the fixed duration of time. If the user acknowledges the initiation, then the computing device 14 may connect to the security server 130 via the external cellular network 210 using the provided external IP address of the security server 130, and transmit the device data to the security server 130. The security server 130 completes a secure, SSL-encrypted connection or communications channel to the computing device 14 via the cellular network 210 based on the received device data. For instance, the security server 130 may authenticate that a temporary username and password received from the computing device 14 matches the temporary username and password received from the transceiver 125 before establishing the secure connection.

Methods of Implementing Embodiments of the Invention

Figure 3:
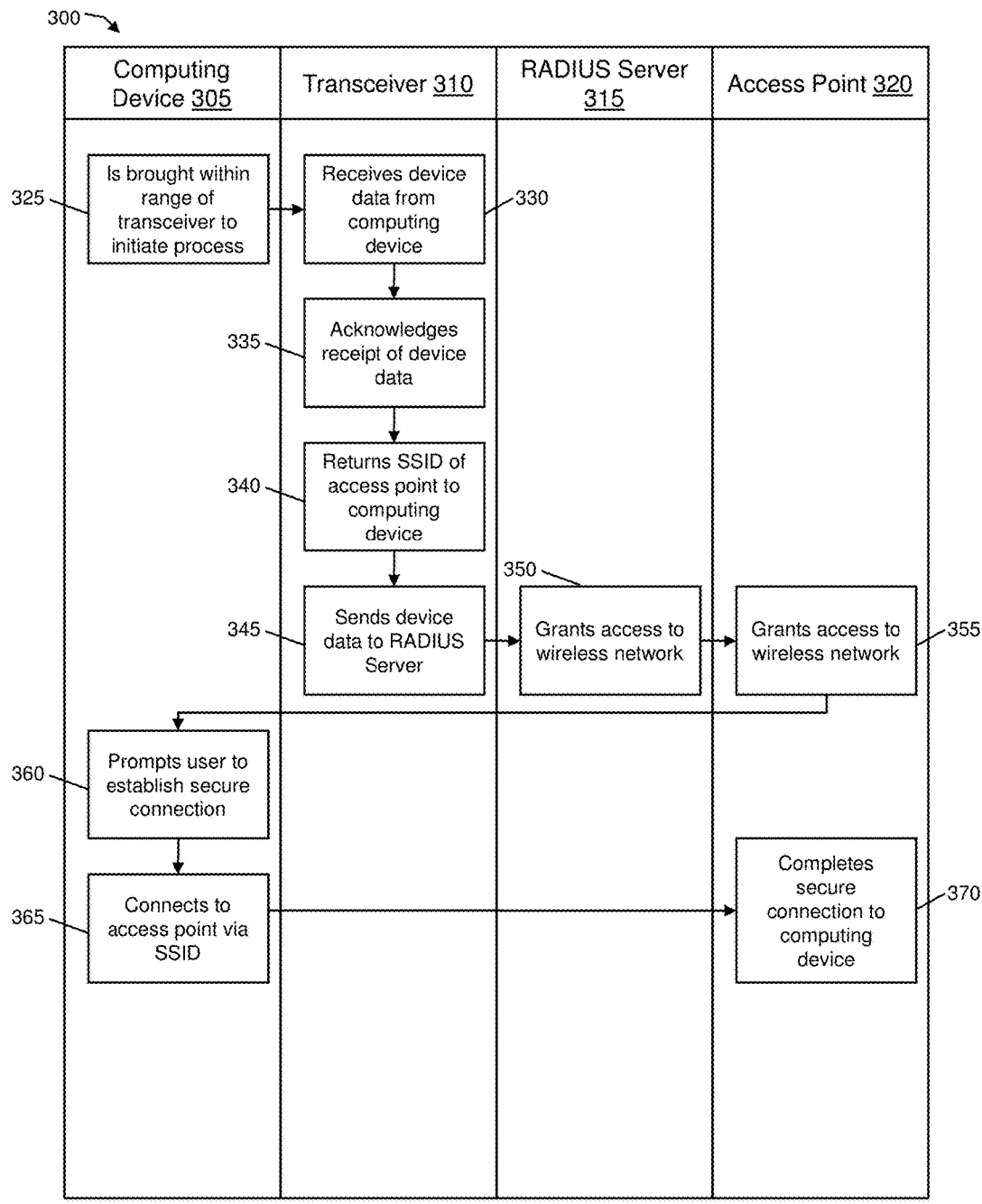
FIG. 3 shows an exemplary swim lane diagram implementing steps in a wireless network in accordance with aspects of the invention.
Figure 4:
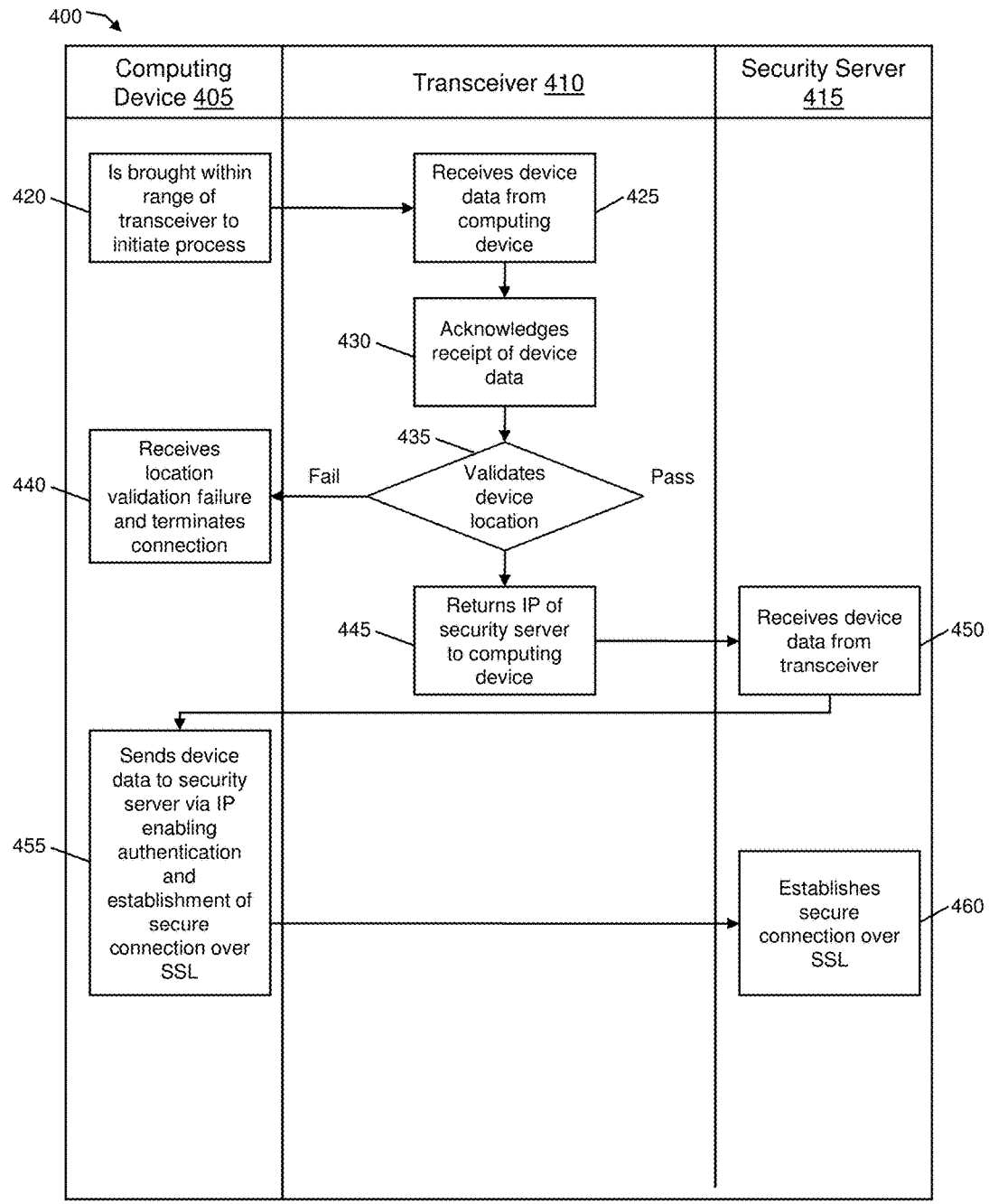
FIG. 4 shows another exemplary swim lane diagram implementing steps in a cellular network in accordance with aspects of the invention.
Figure 5:
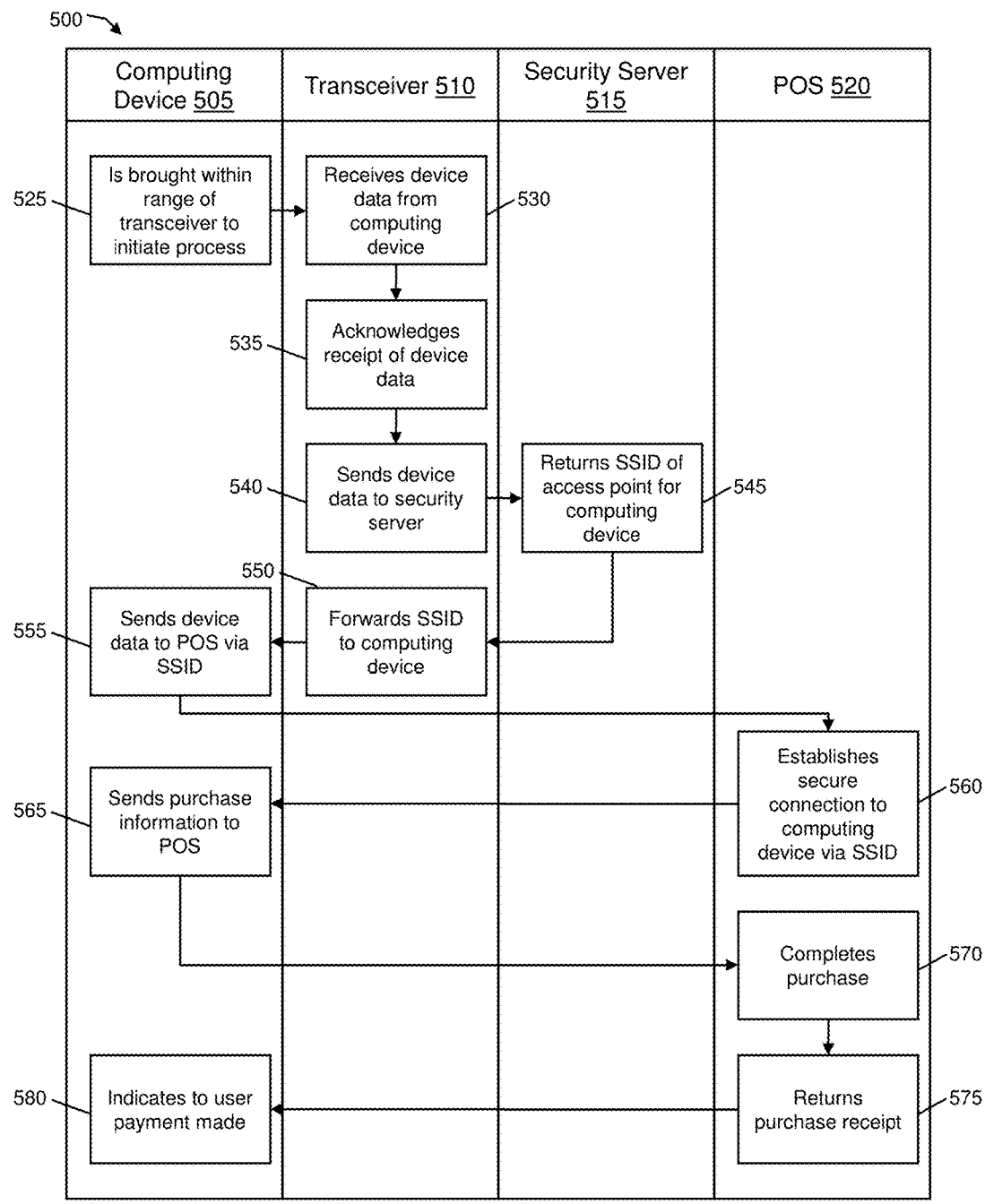
FIG. 5 shows another exemplary swim lane diagram implementing steps in a wireless network in accordance with aspects of the invention.

FIGS. 3-5 show exemplary swim lane diagrams for performing aspects of the present invention. Swim lane" diagrams may be used to show the relationship between the various "components" or "players" in the processes and to define the steps involved in the processes. The steps of FIGS. 3 and 5 may be implemented in the environment of FIG. 1, while the steps of FIG. 4 may be implemented in the environment of FIG. 2, for example.

The swim lane and block diagrams in the Figures illustrate the architecture, functionality, and operation of possible implementations of systems, methods and computer program products according to various embodiments of the present invention. In this regard, each block in the swim lane or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or swim lane diagrams, and combinations of blocks in the block diagrams and/or swim lane diagrams, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1 or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

In particular, FIG. 3 depicts an exemplary swim lane diagram 300 for a process in a wireless network in accordance with aspects of the present invention. The swim diagram 300 includes four swim lanes 305, 310, 315, and 320. Specifically, the swim lane 305 shows actions performed by a computing device (e.g., 14 in FIG. 1), the swim lane 310 shows actions performed by a transceiver (e.g., 125), the swim lane 315 shows actions performed by a RADIUS server (e.g., a security server 130), and the swim lane 320 shows actions performed by an access point (e.g., 135).

At step 325, the process begins. This step may include, for example, the computing device being brought within a range of the transceiver to initiate the process, and the computing device sending device data including a temporary username and password to the transceiver. At step 330, the transceiver receives the device data from the computing device. At step 335, the transceiver acknowledges the receipt of the device data from the computing device.

At step 340, the transceiver returns a SSID of the access point to the computing device. At step 345, the transceiver sends the device data to the RADIUS server. At step 350, the RADIUS server grants the computing device access to the wireless network and may forward the device data to the access point. At step 355, the access point grants the computing device access to the wireless network.

At step 360, the computing device prompts the user to acknowledge the initiation of establishing a secure connection to the wireless network. At step 365, the computing device connects to the access point using the provided SSID of the access point and may send the device data to the access point for authentication and/or verification of the device data. At step 370, the access point completes the secure connection to the computing device after authenticating or verifying the device data, and as a result, the computing device can securely communicate with the wireless network.

FIG. 4 depicts another exemplary swim lane diagram 400 for a process in a cellular network in accordance with aspects of the present invention. The swim diagram 400 includes three swim lanes 405, 410, and 415. Specifically, the swim lane 405 shows actions performed by a computing device (e.g., 14 in FIG. 2), the swim lane 410 shows actions performed by a transceiver (e.g., 125), and the swim lane 415 shows actions performed by a security server (e.g., 130).

At step 420, the process begins. This step may include, for example, the computing device being brought within a range of the transceiver to initiate the process, and the computing device sending device data including a temporary username and password to the transceiver. At step 425, the transceiver receives the device data from the computing device. At step 430, the transceiver acknowledges the receipt of the device data from the computing device.

At step 435, the transceiver validates whether a location of the computing device is the same as the location received in the device data. If the location of the computing device fails this validation test, then at step 440, the computing device receives a location validation failure message from the transceiver and terminates a connection to the transceiver. If the location of the computing device fails the validation step, then at step 445, the transceiver returns to the computing device an external IP address of the security server.

At step 450, the security server receives the device data from the transceiver. At step 455, the computing device sends the device data to the transceiver via the provided external IP address of the security server. The device data is used by the security server to authenticate and establish a secure connection between the computing device and the security server over a SSL-encrypted communications channel. At step 460, the security server establishes the secure connection to the computing device based on the received device data from the transceiver and the computing device, and this process of the invention ends. This secure connection between the security server and the computing device allows for a secure connection between the computing device and the cellular network.

FIG. 5 depicts another exemplary swim lane diagram 500 for another process in a wireless network in accordance with aspects of the present invention. The swim diagram 500 includes four swim lanes 505, 510, 515, and 520. Specifically, the swim lane 505 shows actions performed by a computing device (e.g., 14 in FIG. 1), the swim lane 510 shows actions performed by a transceiver (e.g., 125), the swim lane 515 shows actions performed by a security server (e.g., 130), and the swim lane 520 shows actions performed by a POS.

At step 525, the process begins. This step may include, for example, the computing device being brought within a range of the transceiver to initiate the process, and the computing device sending device data including a temporary username and password to the transceiver. At step 530, the transceiver receives the device data from the computing device. At step 535, the transceiver acknowledges the receipt of the device data from the computing device.

At step 540, the transceiver sends the device data to the security server. At step 545, the security server returns an SSID of an access point of the wireless network for the computing device to the transceiver. At step 550, the transceiver forwards the SSID of the access point to the computing device. At step 555, the computing device sends the device data to the POS via the access point with the provided SSID for authentication and/or verification of the device data.

At step 560, the POS establishes a secure connection to the computing device via the access point with the provided SSID after authenticating and/or verifying the device data. The POS may establish the secure connection based on a previously-established SSL communications channel with the computing device. At step 565, the computing device sends purchase information (e.g., credit card information) to the POS. At step 570, the POS completes the purchase of an item. At step 575, the POS indicates to the user that payment has been received by returning a purchase receipt to the computing device. At step 580, the computing device indicates to the user that payment has been made by, for example, presenting the purchase receipt to the user via a user interface (e.g., the I/O device 28), and this process of the present invention ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a hardware computer infrastructure having computer executable code tangibly embodied on a computer readable storage medium having programming instructions, the method comprising:
   blocking, by a computing device, generating of a username and a password for a predetermined duration of time by placing an expiration flag on a current username and password for the predetermined duration of time;
   randomly generating the username and the password at the computing device of the hardware computer infrastructure;
   sending, by the computing device, device data including at least the username and the password to a transceiver;
   setting, by the computing device, an expiration time for the username and the password;
   after the expiration time is reached, generating, by the computing device, another username and password and sending the another username and password to the transceiver;
   receiving, by the computing device, a service set identifier (SSID) that identifies an access point in a wireless network from the transceiver; and
   sending the device data to the access point based on the SSID of the access point.

2. The method of claim 1, wherein the hardware computer infrastructure comprises a radio-frequency identification (RFID) chip which is bi-directional and which comprises a shared memory.

3. The method of claim 1, wherein the device data further comprises at least one of:
   a geographical location of the hardware computer infrastructure;
   a Media Access Control (MAC) address of the hardware computer infrastructure;
   a identification number of the transceiver; and
   a public key generated by the hardware computer infrastructure.

4. The method of claim 1, further comprising:
   generating a public key and a private key randomly; and
   sending the public key to the transceiver.

5. The method of claim 1, further comprising:
establishing a secure connection to the computing device of the hardware computer infrastructure based on the device data received from the transceiver; and
the transceiver encrypting at least one of the device data and the SSID of the access point before sending the at least one of the device data and the SSID of the access point.

6. The method of claim 1, wherein the sending of the device data to the transceiver is performed when the hardware computer infrastructure is within a range of the transceiver.

7. The method of claim 6, wherein the sending of the device data to the transceiver occurs via induction of a radio-frequency identification (RFID) chip of the hardware computer infrastructure.

8. The method of claim 7, further comprising receiving an acknowledgment receipt of the device data from the transceiver.

9. The method of claim 1, further comprising prompting a user of the hardware computer infrastructure to acknowledge an initiation of establishing the secure connection to the wireless network.

10. The method of claim 1, further comprising:
sending purchase information via the secure connection to a point of sale in the wireless network;
receiving a purchase receipt via the secure connection from the point of sale; and
indicating to a user that a payment has been made.

11. The method of claim 1, wherein the predetermined duration of time is a time that the access point establishes the secure connection to the hardware computer infrastructure.

12. The method of claim 11, further comprising preventing the username and password from being changed.

13. A method for establishing a secure connection between a hardware computer infrastructure and a wireless network, comprising:
blocking, by a computing device, generating of a username and a password for a predetermined duration of time by placing an expiration flag on a current username and password for the predetermined duration of time;
randomly generating the username and the password at the computing device of the hardware computer infrastructure;
sending, by the computing device, device data including at least the username and the password to a transceiver;
after an expiration time is reached, generating, by the computing device, another username and password and sending the another username and password to the transceiver;
receiving, by the computing device, a service set identifier (SSID) that identifies an access point in the wireless network from the transceiver; and
sending the device data to the access point based on the SSID of the access point.

14. The method of claim 13, wherein the access point establishes the secure connection over SSL-encrypted communications channels.

15. The method of claim 14, wherein the username and the password are a temporary username and a temporary password.

16. The method of claim 14, further comprising:
sending purchase information via the secure connection to a point of sale in the wireless network;
receiving a purchase receipt via the secure connection from the point of sale; and
indicating to a user that a payment has been made.

17. The method of claim 14, further comprising preventing the username and password from being changed.

* * * * *